United States Patent
Vidales (10) Patent No.: US 6,178,527 B1
(45) Date of Patent: Jan. 23, 2001

(54) SYSTEMS AND METHODS FOR INTERMITTENTLY COMMUNICATING DIAGNOSTIC INFORMATION FROM USER INPUT DEVICES

(75) Inventor: Carlos E. Vidales, Raleigh, NC (US)

(73) Assignee: Ericsson Inc., Research Triangle Park, NC (US)

( * ) Notice: Under 35 U.S.C. 154(b), the term of this patent shall be extended for 0 days.

(21) Appl. No.: 08/936,661

(22) Filed: Sep. 24, 1997

(51) Int. Cl.[7] ........................................ G06F 11/26
(52) U.S. Cl. .............................. 714/44; 340/636
(58) Field of Search .................. 714/25, 31, 40, 714/44; 340/635, 636; 379/21, 29; 455/423

(56) References Cited

U.S. PATENT DOCUMENTS

| | | | |
|---|---|---|---|
| 4,056,815 | * 11/1977 | Anderson | 340/224 |
| 4,067,000 | 1/1978 | Carlson | 340/171 R |
| 4,578,671 | * 3/1986 | Flowers | 340/636 |
| 4,953,165 | 8/1990 | Jackson | 371/16.1 |
| 5,237,663 | 8/1993 | Srinivasan | 395/325 |
| 5,506,572 | 4/1996 | Hills et al. | 340/636 |
| 5,576,689 | * 11/1996 | Queen | 340/514 |
| 5,612,960 | * 3/1997 | Stevens et al. | 371/20.1 |
| 5,671,375 | * 9/1997 | Stockstad et al. | 395/309 |
| 5,850,188 | * 12/1998 | Doyle et al. | 340/825.69 |
| 5,867,659 | * 2/1999 | Otteson | 395/200.54 |
| 5,884,202 | * 3/1999 | Arjomand | 701/29 |

FOREIGN PATENT DOCUMENTS

| | | |
|---|---|---|
| 2 304 247 | 3/1997 | (GB) . |
| 403152602 | * 6/1991 | (JP) ........................... G05B/19/05 |
| 04105134 | 7/1992 | (JP) . |

OTHER PUBLICATIONS

"Direct Diagnostic of Keyboard Hardware on a Personal Computer," IBM Technical Disclosure Bulletin, XP–000714961, vol. 28, No. 2, Jul. 1985, p. 758.

International Search Report, PCT/US98/19460, Dec. 23, 1998.

* cited by examiner

Primary Examiner—Robert W. Beausoliel, Jr.
Assistant Examiner—Scott T. Baderman
(74) Attorney, Agent, or Firm—Myers Bigel Sibley & Sajovec (57) ABSTRACT

A user input device, e.g., a wireless keyboard, for providing user inputs to a receiver unit via a communications medium intermittently transmits diagnostic messages in the communications medium such that a diagnostic message is transmitted after a predetermined interval following transmission of a preceding diagnostic message has expired. A receiver unit is responsive to the communications medium and configured to receive the transmitted diagnostic message and process the received diagnostic message to determine a status of the user input device. Preferably, the user input device is configured to transmit a diagnostic message following at least one of passage of a predetermined fixed time interval after a diagnostic message was previously transmitted from the user input device and acceptance of a predetermined number of user inputs at the user input device after a diagnostic message was previously transmitted from the user input device.

17 Claims, 5 Drawing Sheets

SYSTEMS AND METHODS FOR INTERMITTENTLY COMMUNICATING DIAGNOSTIC INFORMATION FROM USER INPUT DEVICES

FIELD OF THE INVENTION

The present invention relates to electronic devices such as personal computers, televisions, and the like, more particularly, to systems and methods for providing user inputs to such devices.

BACKGROUND OF THE INVENTION

User input devices such as keyboards, joysticks and remote controllers are used to provide user inputs to a variety of electronic systems such as personal computers, televisions, video cassette recorders (VCRs), audio systems and the like. Keyboard data entry is commonly used in data processing systems such as desktop and portable personal computers, and may also be used in devices such as personal digital assistants (PDAs), portable intelligent communicators (PICs), and Web TVs. Other user input devices may not include a keyboard as such, but may include keylike mechanisms such as buttons, triggers and the like.

Wireless user input devices such as wireless keyboards are becoming increasingly popular because of the portability and flexibility they offer. As wireless user input devices typically are battery-powered to increase their portability, these devices tend to be limited by the energy storage capability of the batteries used in the devices. Accordingly, it generally is desirable to provide the user of a device with the ability to monitor the status of the battery in a wireless user input device. In addition to power monitoring, it may also be desirable to monitor other characteristics of the user input device, to provide diagnostic information about the performance of the device, e.g., fault information or statistical information about the operation of the device.

However, conventional user input devices typically are designed to minimize production costs and thus tend to have limited diagnostic capabilities. Although a visual display of diagnostic information such as a low battery LED indicator may be provided on a user input device, the informational capability offered by such a simple display tends to be limited. For example, such a display is generally incapable of providing more detailed diagnostic information such as keystroke statistics, fault frequency and the like. In addition to this limited self-diagnostic capability, conventional user input devices typically are only capable of half-duplex communications, i.e., are only capable of sending data from the user input device to the data processing system. Consequently, it generally is not possible for a data processing system to request information from the user input device for purposes of performing more complex diagnostic analyses. Building full-duplex communication capability into a user input device to provide such a capability typically is not desirable, as this may add significantly to the complexity and cost of the device.

SUMMARY OF THE INVENTION

In light of the foregoing, it is an object of the present invention to provide systems and methods for communicating diagnostic information from a user input device that provide improved capability to determine a status of a user input device.

It is another object of the present invention to provide systems and methods for communicating diagnostic information from a user input device that can utilize a half-duplex communications link.

It is yet another object of the present invention to provide improved systems and methods for monitoring battery power in a user input device.

These and other objects, features and advantages are provided according to the present invention by user input devices, systems and methods in which diagnostic messages are intermittently transmitted from a user input device to a receiver unit, e.g., a personal computer, PDA, TV, VCR or the like, such that each diagnostic message is transmitted following expiration of a predetermined interval after a diagnostic message was previously transmitted. The predetermined interval may be defined, for example, as a fixed time interval following a previous transmission of a diagnostic message, or by the occurrence of a predetermined event such as the acceptance of a predetermined number of user inputs following a previous transmission of a diagnostic message. The intermittently transmitted diagnostic information may then be processed at the receiver unit to determine a status of the user input device. Diagnostic information may be determined at the user input device in response to acceptance of a user input such as a keystroke at the user input device, and subsequently transmitted in a diagnostic message.

The present invention arises from the realization that diagnostic information may be conveyed more advantageously from a device such as a wireless keyboard by regularly but intermittently transmitting the information. Regular, automatic transmission of diagnostic information can provide an increased flow of diagnostic information to the receiver unit without requiring the receiver unit to request diagnostic information from the user input device. By using diagnostic information transmitted in an unsolicited manner, a more cost-effective half-duplex communications capability can be utilized in the user input device. By constraining the transmission of the information to be intermittent, power consumption can be reduced.

In particular, according to the present invention, a user input device for providing user inputs to a receiver unit via a communications medium intermittently transmits diagnostic messages in the communications medium such that a diagnostic message is transmitted after a predetermined interval following transmission of a preceding diagnostic message has expired. A receiver unit, responsive to the communications medium, is configured to receive the transmitted diagnostic message and to process the received diagnostic message to determine a status of the user input device. Preferably, the user input device is configured to transmit a diagnostic message following at least one of passage of a predetermined fixed time interval after a diagnostic message was previously transmitted from the user input device and acceptance of a predetermined number of user inputs at the user input device after a diagnostic message was previously transmitted from the user input device.

According to embodiments of the present invention, the user input device includes diagnostic information determining means for determining diagnostic information, and intermittent diagnostic message transmitting means, responsive to the diagnostic information determining means, for transmitting a diagnostic message corresponding to the determined diagnostic information in the communications medium following at least one of passage of a predetermined fixed time interval after a diagnostic message was previously transmitted from the user input device and acceptance of a predetermined number of user inputs at the user input device after a diagnostic message was previously transmitted from the user input device. The user input device also may include user input accepting means for accepting a user input, and user input message transmitting means, responsive to the user input accepting means, for transmitting a corresponding user input message in the communications medium.

According to one embodiment of the present invention, the diagnostic information determining means includes means, responsive to the user input accepting means, for determining the diagnostic information in response to acceptance of a user input. The user input accepting means may include a plurality of keys, and the diagnostic information determining means may include means, responsive to the plurality of keys, for determining diagnostic information in response to a keystroke performed on a key of the plurality of keys. The intermittent diagnostic message transmitting means may include means, responsive to the diagnostic information determining means, for storing diagnostic information corresponding to the determined diagnostic information, and means, responsive to the means for storing and to the plurality of keys, for transmitting a diagnostic message corresponding to the stored diagnostic information in the communications medium following at least one of passage of a predetermined fixed time interval after a diagnostic message was previously transmitted from the user input device and performance of a predetermined number of keystrokes on the plurality of keys after a diagnostic message was previously transmitted from the user input device. The user input message transmitting means and the diagnostic message transmitting means may include a circuit, such as a common microcontroller, which is responsive to a user input and which transitions to a higher power consumption active mode from a lower power consumption standby mode in response to a keystroke performed on the plurality of keys and transitions to the standby mode after the user input and diagnostic messages are transmitted. The intermittent diagnostic message transmitting means and the user input message transmitting means may also include an infrared transmitter.

According to method aspects of the present invention, diagnostic information is communicated from a user input device which is configured to communicate user inputs to a receiver unit by intermittently transmitting diagnostic messages from the user input device, wherein a diagnostic message is transmitted from the user input device after a predetermined interval following transmission of a preceding diagnostic message has expired. A diagnostic message may be transmitted following at least one of passage of a predetermined fixed time interval after a diagnostic message was previously transmitted from the user input device and acceptance of a predetermined number of user inputs at the user input device after a diagnostic message was previously transmitted from the user input device.

According to another aspect of the present invention, diagnostic information may be determined in response to acceptance of the user input, and a corresponding diagnostic information message transmitted. The user input device may include a plurality of keys, and diagnostic information may be determined in response to a keystroke performed on a key of the plurality of keys. Prior to transmission of a diagnostic message, diagnostic information corresponding to the determined diagnostic information may be stored at the user input device. A diagnostic message corresponding to the stored diagnostic information is transmitted following at least one of passage of a predetermined fixed time interval after a diagnostic message was previously transmitted from the user input device and performance of a predetermined number of keystrokes on the plurality of keys after a diagnostic message was previously transmitted from the user input device. The transmitted diagnostic message may be received and processed to determine a status of the user input device. Improved diagnostic systems and methods are thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 1:
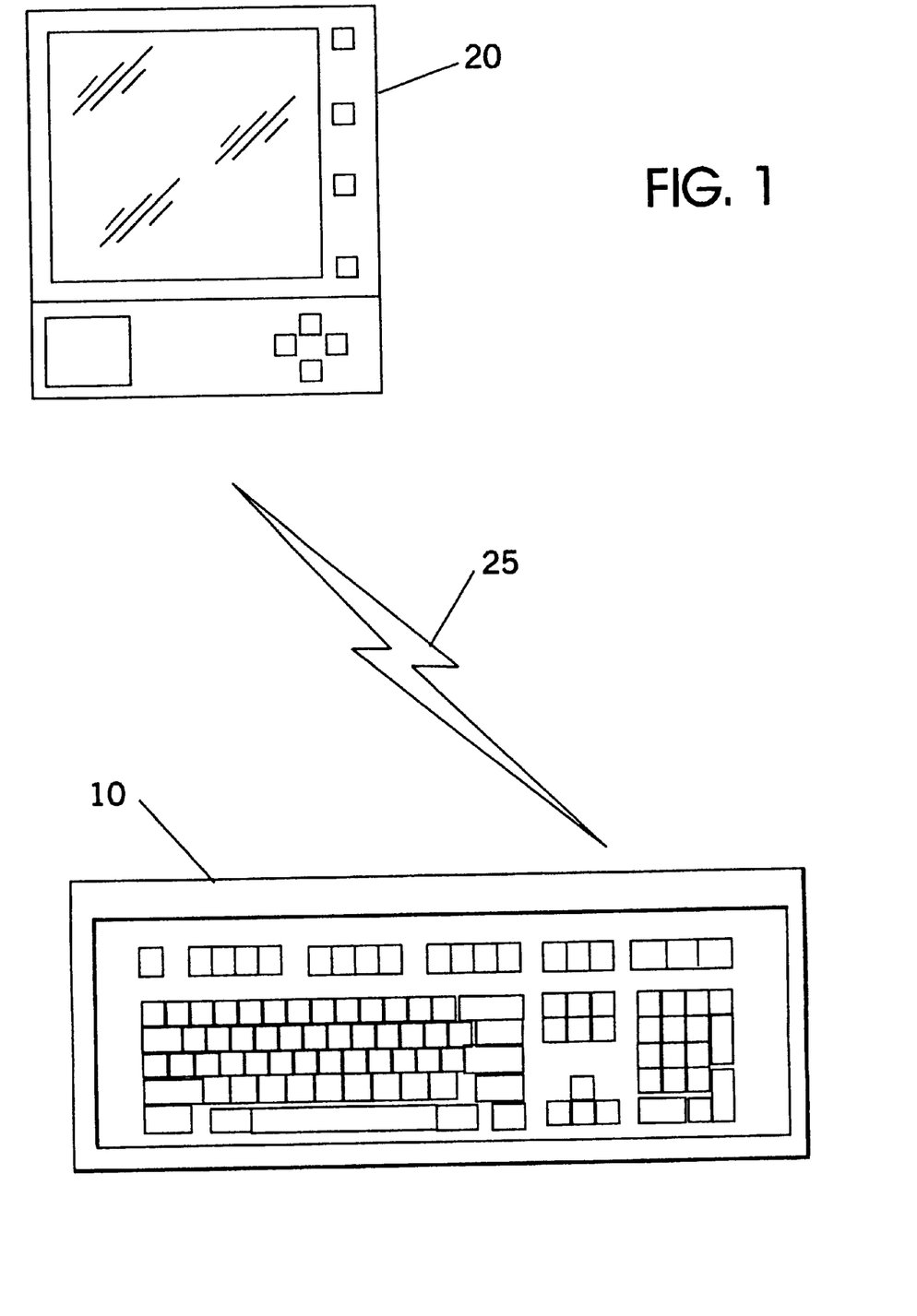
FIG. 1 illustrates a user input device and a personal digital assistance (PDA) in which the present invention may be embodied.

FIG. 1 illustrates a user input device, e.g., a wireless keyboard 10, for providing user inputs to a receiver unit such as a personal digital assistant (PDA) 20. The keyboard 10 may be linked to the PDA 20 via an infrared link 25. Components of an infrared communications link which may be present but not shown, such as transmitters and receivers located in the keyboard 10 and the PDA 20, are well known to those skilled in the art, and need not be discussed in greater detail herein. Those skilled in the art will appreciate that although the discussion herein relates to infrared wireless keyboard applications, the systems and methods of the present invention are also applicable to other systems such as wired keyboards and wireless keyboards which use radio frequency, optical or other communications techniques. It will also be understood that the present invention is applicable to user input devices other than keyboards, such as keypads, digitizers, light pens, bar-code readers, optical character readers, mouse-type devices, remote controllers and the like. Those skilled in the art will also appreciate that the present invention is applicable to receiver units other than PDAs, such as personal computers, set-top boxes, TVs, VCRs and the like.

Figure 2:
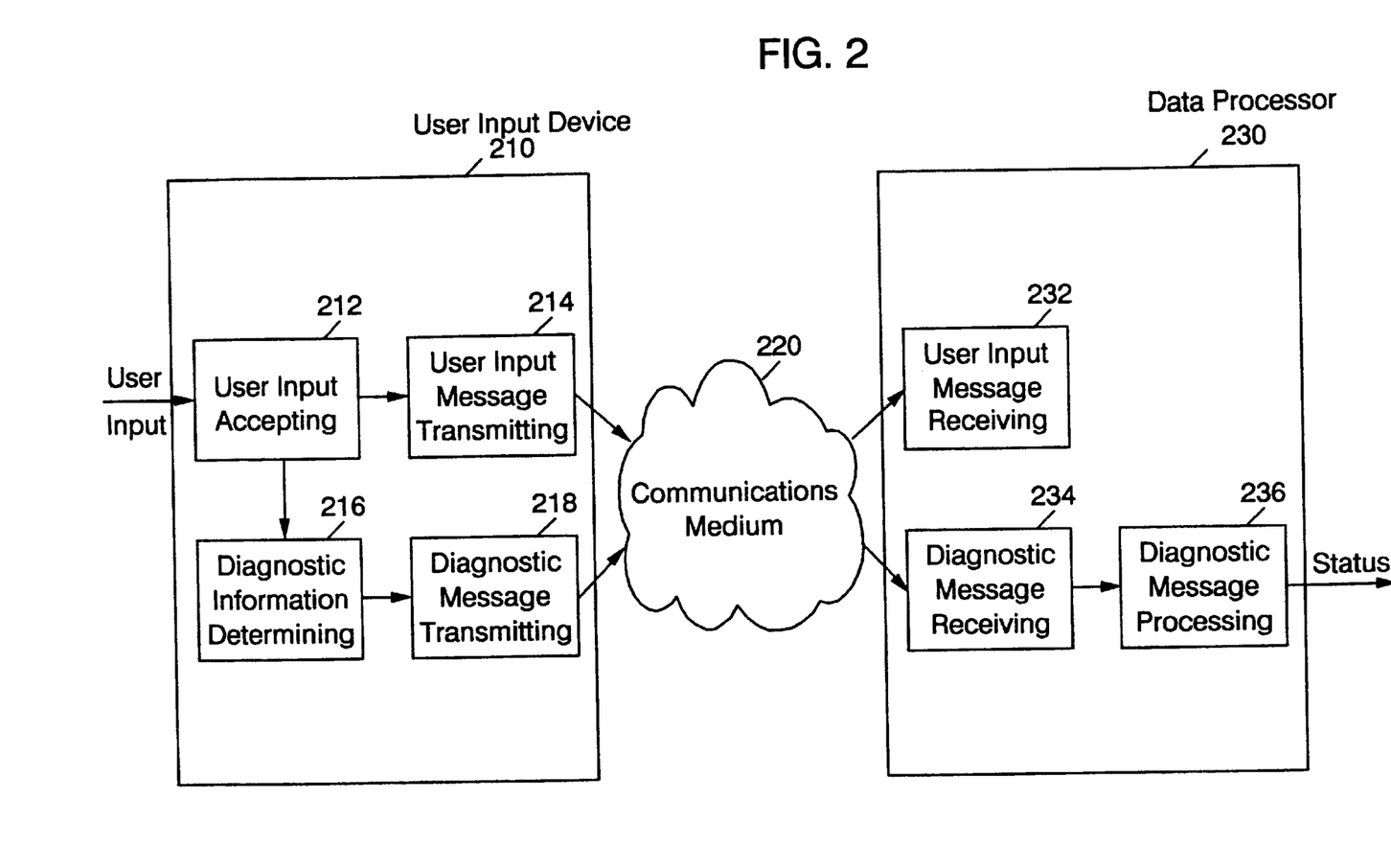
FIG. 2 is a schematic diagram illustrating an embodiment of a system according to the present invention.

FIG. 2 provides a conceptual illustration of an embodiment of a system according to the present invention, including a user input device 210 which communicates with a receiver unit 230 via a communications medium 220. In particular, the user input device 210 includes user input accepting means 212 for accepting a user input from a user. Responsive to the user input accepting means 212, user input message transmitting means 214 transmit a corresponding user input message in the communications medium 220. Also responsive to the user input accepting means 212, diagnostic information determining means 216 determines diagnostic information about the user input device 210, such as a battery power level, user input statistics, and the like, as described in greater detail below. Intermittent diagnostic message transmitting means 218 transmits a diagnostic message corresponding to the determined diagnostic information in an intermittent fashion, i.e., by transmitting the diagnostic message after a predetermined interval has passed after a preceding diagnostic message was transmitted from the user input device 210. The predetermined interval may be defined, for example, by a fixed time period or a number of user inputs accepted at the user input device 210.

The receiver unit 230 includes user input message receiving means 232 for receiving the transmitted user input message from the communications medium 220. The received user input message typically is further processed to provide input, for example, to an application resident at the receiver unit 230, e.g., a computer program. The receiver unit 230 also includes diagnostic message receiving means 234 for receiving the transmitted diagnostic message from the communications medium 220. The received diagnostic message is then processed by diagnostic message processing means 236 to determine a status of the user input device 210.

The means embodied in the user input device 210 and the receiver unit 230 may include a number of commonly used electronics components, the operation of which is well known to those skilled in the art. For example, the user input device 210 may take the form of a remote controller as commonly-used with a TV or VCR, with the user input accepting means including a keypad comprising a plurality of keys, as well as electronic circuitry which is operative to generate signals in response to keystrokes performed on the keypad. The user input accepting means 212 and the user input transmitting means 214 may also, for example, include an electronic circuit such as common microcontroller which processes signals generated in response to a user input and generates corresponding user input messages for transmission from the user input device 210. The microcontroller may also be used to implement the diagnostic information determining means 216 and the intermittent diagnostic message transmitting means 218. For example, the microcontroller may monitor various diagnostic signals produced by circuits within the user input device 210 and may generate corresponding diagnostic messages therefrom. The user input message transmitting means 214 and the intermittent diagnostic message transmitting means 218 may include wireless transmitter circuitry such as an infrared transmitter or a radio frequency (RF) transmitter, as well as wired transmission devices such as transmission line drivers. Those skilled in the art will appreciate that the means incorporated in the user input device 210 generally may be implemented using special purpose hardware such as digital and analog circuitry, application-specific circuits (ASICs) and the like, software or firmware running on data processing hardware, or combinations thereof.

Similarly, the receiver unit 230, e.g. a TV, VCR, may include commonly used components configured to receive and process the transmitted user input and diagnostic messages. The user input message receiving means 232 and the diagnostic message receiving means 234 may include wireless receiving circuitry such as an infrared or RF receiver circuit, as well as circuitry adapted to reception of signals from a wired communications medium such as buffer circuits. The diagnostic message processing means 236 may include, for example, a microprocessor or microcontroller, a display and other components which may be used to process a received diagnostic message and determined a status of the user input device 210 therefrom. Those skilled in the art will appreciate that the means incorporated in the receiver unit 230 generally may be implemented using special purpose hardware such as digital and analog circuitry, application-specific circuits (ASICs) and the like, software or firmware running on data processing hardware, or combinations thereof.

Figure 3:
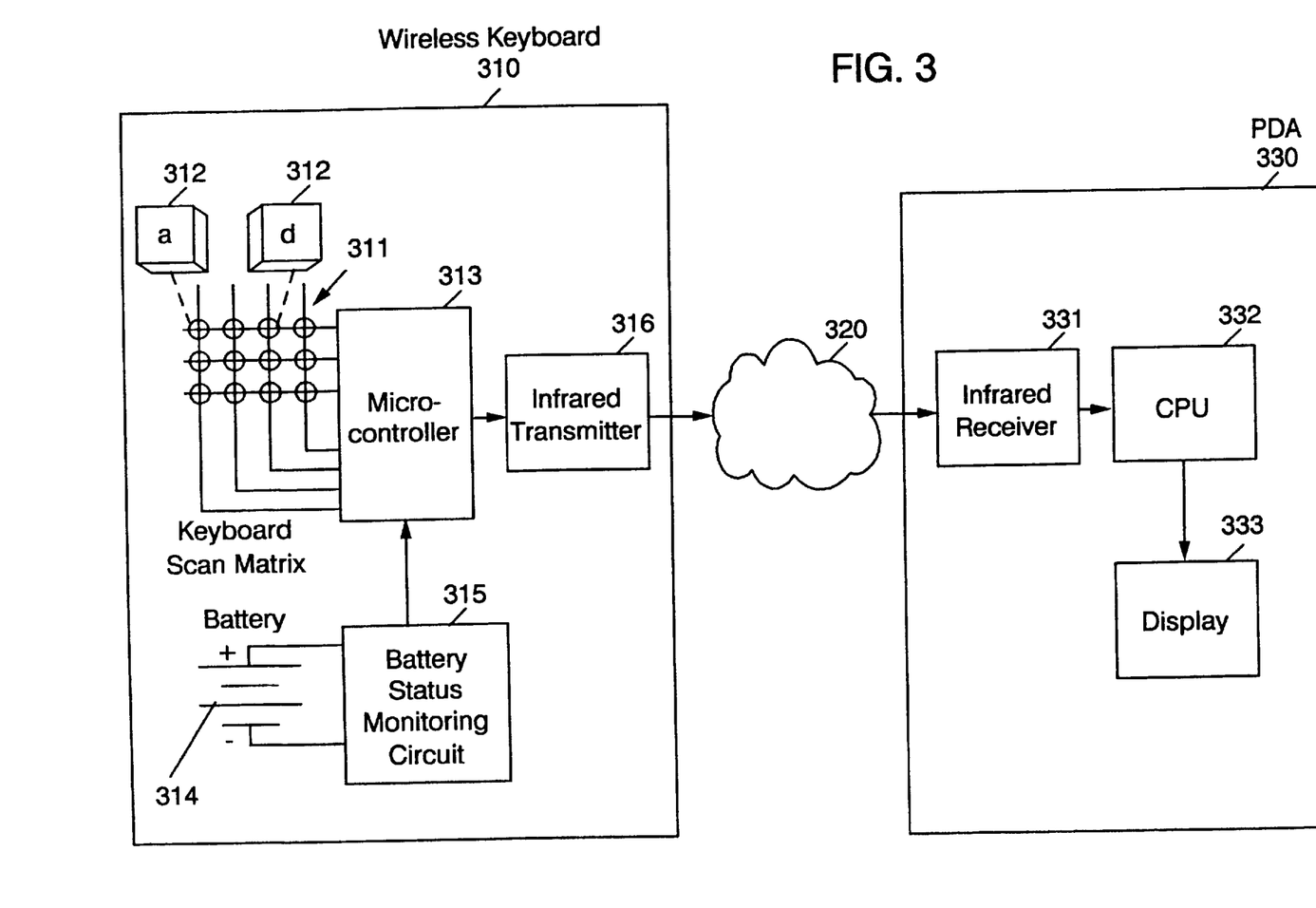
FIG. 3 is a schematic diagram of an embodiment of a system according to the present invention.

FIG. 3 illustrates an exemplary embodiment of the present invention, in particular, a system including a wireless keyboard 310 which communicates with a personal digital assistant (PDA) 330 via an infrared communications link established via an air communications medium 320. The wireless keyboard 310 includes a keyboard scan matrix 311 which is responsive to a plurality of keys 312 to generate signals in response to keystrokes performed on the plurality of keys 312. The signals are fed to a microcontroller 313, which in turn generates a user input message corresponding to the generated signals. For example, the microcontroller 313 may generate a message including a keycode of a keycode set that maps particular keystrokes to particular binary values. The wireless keyboard also is shown as including a battery 314 that provides power to the microcontroller 313 and other elements of the wireless keyboard 310. A battery status monitoring circuit, e.g., a comparator circuit that compares the voltage present at the battery 314 to a reference voltage, monitors the battery 314 and sends diagnostic information to the microcontroller 313.

The microcontroller 313 generates a corresponding diagnostic message from the diagnostic information and stores the diagnostic message, for example, in onboard memory or external memory such as a RAM. The microcontroller 313 may, for example, generate and store a diagnostic message including a code of the keycode set used for communicating keystrokes. An infrared transmitter 316 is responsive to the microcontroller 313 to transmit infrared signals representing the user input and diagnostic messages in the communications medium 320. For example, the infrared transmitter 316 may include an infrared light-emitting diode (LED) or similar device that may be modulated by a signal produced by the microcontroller 313 to transmit a message.

The infrared signals produced may be received at the PDA 330 from the communications medium 320 by an infrared receiver 331, for example, a circuit including a phototransistor or photodiode which is responsive to infrared radiation to demodulate the infrared signal to receive the user input and diagnostic messages. The user input and diagnostic messages represented by the received signal are then processed in a central processing unit (CPU) 332, e.g., a microprocessor. The CPU 332 may process the received diagnostic message to determine a status of the wireless keyboard, e.g., a status of the battery 314. The determined status may in turn, for example, be displayed on a display 333 included in the PDA 330.

For the illustrated embodiment of FIG. 3, this status relates to a status of a battery 314 used to power the user input device 310. However, those skilled in the art will appreciate that the diagnostic information may include other information of diagnostic utility, such as statistical information about the number and frequency of particular keystrokes, fault conditions on particular keys, and the like. This diagnostic information may be conveyed to the receiver unit 330 and used, alone or in combination, to determine other status information relating to the operation of the user input device 310.

According to the present invention, diagnostic messages are intermittently transmitted from a user input device such that a diagnostic message is transmitted after expiration of a predetermined interval following transmission of a preceding diagnostic message. The intermittent reporting of such diagnostic information to the receiver unit allows the user input device to automatically provide diagnostic information on a regular basis without requiring the user to perform a special keystroke or series of keystrokes, and without using an inordinate amount of power. Accordingly, the "predetermined interval" may be defined either as a fixed time interval or an interval defined by a predetermined event, for example, the acceptance of a predetermined number of user inputs at the user input device after transmission of the preceding diagnostic message.

Figure 4:
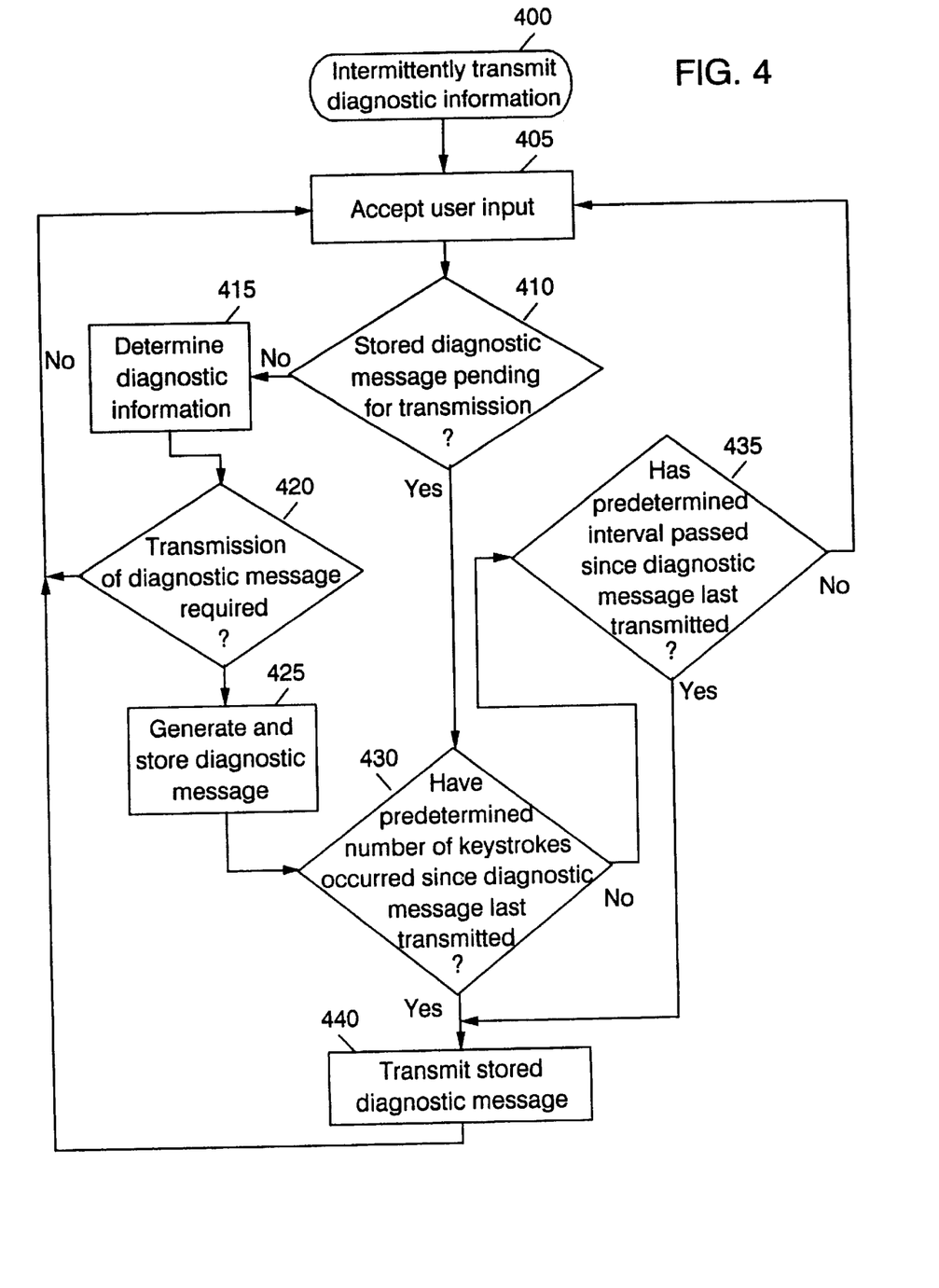
FIGS. 4 and 5 are flowchart illustrations of operations for communicating diagnostic information according to an aspect of the present invention.
Figure 5:
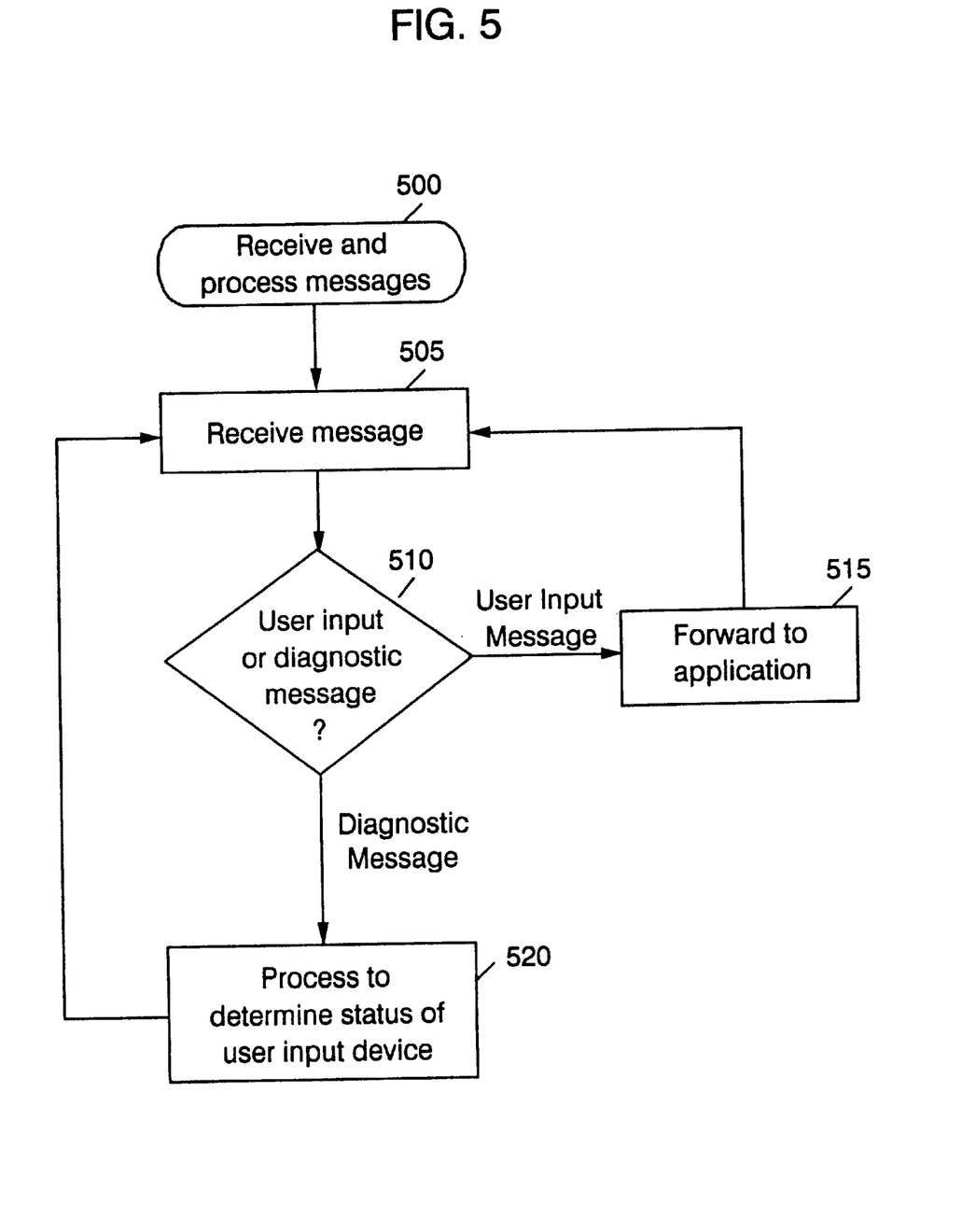

The flowchart illustrations of FIGS. 4 and 5 illustrate methods and apparatus (systems) for performing such diagnostic communications according to the invention. It will be understood that each block of the flowchart illustrations, and combinations of blocks in the flowchart illustrations, can be implemented by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Exemplary operations (Block 400) for intermittently transmitting diagnostic information from a user input device are illustrated in FIG. 4. A user input, e.g., a keystroke, is accepted at the user input device (Block 405). In response, the user input device determines whether a diagnostic message is stored and currently pending for transmission to the receiver unit (Block 410). If not, the user input device determines diagnostic information, such as a battery level (Block 415). At this point, the user input device may perform a preliminary analysis as to whether the diagnostic information indicates a problem which needs to be communicated to the receiver unit (Block 420); those skilled in the art will appreciate, however, that the user input device may simply determine the diagnostic information and prepare it for communication to the receiver unit. If communication of the diagnostic information is not desired, the device may return to a standby mode, awaiting another user input (Block 405).

If the diagnostic information is to be communicated, however, the user input device generates and stores a diagnostic message corresponding to the determined diagnostic information (Block 425). If the user input device has a diagnostic message stored and awaiting transmission, the user input device then determines whether a predetermined number of user inputs, e.g., keystrokes, have been accepted after a preceding diagnostic message was transmitted (Block 430). If the predetermined number of keystrokes have not been accepted, the user input device may determine if a fixed time interval has passed since a preceding diagnostic message was transmitted (Block 435), and if so, transmits the stored message (Block 440). If the fixed time interval has not passed, the user input device awaits a new user input (Block 405). If the fixed time interval has past or if the predetermined number of keystrokes have been accepted since a diagnostic message was previously transmitted, the stored diagnostic message is transmitted (Block 440). Transmission of the stored diagnostic message preferably occurs immediately following the transmission of a user input message corresponding to the accepted user input.

FIG. 5 illustrates exemplary operations for receiving and processing messages at a receiving unit (Block 500). A message is received (Block 505). The receiving unit next determines whether the received message is a user input message or a diagnostic message (Block 510). If the message is a user input message, it is forwarded to the appropriate application for further processing (Block 515). If the received message is a diagnostic message, it is processed to determine the status of the user input device (Block 520).

Those skilled in the art will appreciate that variations on the exemplary operations illustrated in FIGS. 4 and 5 also fall within the scope of the present invention. The illustrated operations may be particularly advantageous, for example, for a user input device which includes a circuit such as a microcontroller that has the capability to transition between a low-power consumption "standby" mode and a higher-power "active" mode. The circuit performing the functions of Blocks 410–440 transitions to the active mode in response to acceptance of a user input (Block 405) in order to perform the operations of Blocks 410–440, as well as operations needed to generate and transmit a user input message corresponding to the accepted user input, and then may transition back to the standby mode to conserve power. Preferably, the transmission of the stored diagnostic message (Block 440) occurs immediately before or after transmission of the user input message generated from the accepted user input, allowing the circuit to return to the standby mode more quickly. In other variations, diagnostic information may be determined or diagnostic messages may be transmitted without synchronization with acceptance of user inputs and the transmission of corresponding user input messages. For example, diagnostic information may simply be periodically determined and corresponding diagnostic messages transmitted once during a predetermined interval, with the predetermined interval being defined in terms of a fixed time or in terms of acceptance of a predetermined number of user inputs.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:
1. A system comprising:
   a user input device configured to provide user inputs to a communications medium, said user input device intermittently transmit stored diagnostic messages via the communications medium such that a diagnostic message is transmitted after a predetermined time interval following transmission of a preceding diagnostic message;

a receiver unit, responsive to the communications medium, which is configured to receive the transmitted diagnostic message and process the received diagnostic message to determine a status of said user input device; and wherein said user input device is configured to transmit a diagnostic message following both passage of a predetermined fixed time interval and acceptance of a predetermined number of user inputs at said user input device after a diagnostic message was previously transmitted from said user input device.

2. A system according to claim 1:

wherein said user input device comprises:

diagnostic information determining means for determining diagnostic information;

intermittent diagnostic message transmitting means, responsive to said diagnostic information determining means, for transmitting a diagnostic message corresponding to the determined diagnostic information in said communications medium following a predetermined fixed time interval after a diagnostic message was previously transmitted from said user input device; and wherein said receiver unit comprises:

diagnostic message receiving means, responsive to said communications medium, for receiving the transmitted diagnostic message; and diagnostic message processing means, responsive to said diagnostic message receiving means, for processing the received diagnostic message to determine a status of said user input device.

3. A system according to claim 2:

wherein said user input device further comprises:

user input accepting means for accepting a user input; and user input message transmitting means, responsive to said user input accepting means, for transmitting a corresponding user input message in said communications medium; and wherein said receiver unit further comprises:

user input message receiving means, responsive to said communications medium, for receiving the transmitted user input message.

4. A system according to claim 3, wherein said diagnostic information determining means comprises means, responsive to said user input accepting means, for determining the diagnostic information in response to acceptance of a user input.

5. A system comprising:

a user input device configured to provide user inputs to a communications medium, said user input device intermittently transmitting stored diagnostic messages via the communications medium such that a diagnostic message is transmitted after a predetermined time interval following transmission of a preceding diagnostic message;

a receiver unit, responsive to the communications medium, which is configured to receive the transmitted diagnostic message and process the received diagnostic message to determine a status of said user input device;

wherein said user input device comprises:

diagnostic information deter means for determining diagnostic information;

intermittent diagnostic message transmitting means, responsive to said diagnostic information determining means for transmitting a diagnostic message corresponding to the determined diagnostic information in said communications medium following a predetermined fixed time interval after a diagnostic message was previously transmitted from said user-input device;

wherein said receiver unit comprises:

diagnostic message receiving means, responsive to said communications medium, for receiving the transmitted diagnostic message;

diagnostic message processing means, responsive to said diagnostic message receiving means, for processing the received diagnostic message to determine a status of said user input device;

wherein said user input device further comprises:

user input accepting means for accepting a user input;

user input message transmitting means, responsive to said user input accepting means, for transmitting a corresponding user input message in said communications medium;

wherein said receiver unit further comprises:

user input message receiving means, responsive to said communications medium, for receiving the transmitted user input message; and wherein said user input message transmitting means and said diagnostic message transmitting means comprises a circuit responsive to a user input, which transitions to a higher power consumption active mode from a lower power consumption standby mode in response to acceptance of a user input and which transitions to the standby mode after the user input and diagnostic messages are transmitted.

6. A system comprising:

a use input device configured to provide user inputs to a communications medium, said user input device intermittently transmitting stored diagnostic messages via the communications medium such that a diagnostic message is transmitted after a predetermined time interval following transmission of a preceding diagnostic message;

a receiver unit, responsive to the communications medium, which is configured to receive the transmitted diagnostic message and process the received diagnostic message to determine a status of said user input device;

wherein said user input device comprises:

diagnostic information determining means for determining diagnostic information;

intermittent diagnostic message transmitting means, responsive to said diagnostic information determining means, for transmitting a diagnostic message corresponding to the determined diagnostic information in said communications medium following a predetermined fixed time interval after a diagnostic message was previously transmitted from said user input device;

wherein said receiver unit comprises:

diagnostic message receiving means, responsive to said communications medium, for receiving the transmitted diagnostic message;

diagnostic message processing mea responsive to said diagnostic message receiving means, for processing the received diagnostic message to determine a status of said user input device;

wherein said user input device further comprises:

user input accenting means for accepting a user input;

user input message transmitting means, responsive to said user input accepting means, for transmitting a corresponding user input message in said communications medium;

wherein said receiver unit further comprises:

user input message receiving means, responsive to said communications medium, for receiving the transmitted user input message;

wherein said diagnostic information determining means comprises means, responsive to said user input accepting means, for determining the diagnostic information in response to acceptance of a user input;

wherein said user input accepting means comprises a plurality of keys; and wherein said diagnostic information determining means comprises means, responsive to said plurality of keys, for determining diagnostic information in response to a keystroke performed on a key of said plurality of keys.

7. A system comprising:

a user input device configured to provide user inputs to a communications medium, said user input device intermittently transmitting stored diagnostic messages via the communications medium such tat a diagnostic message is transmitted after a predetermined time interval following transmission of a preceding diagnostic message;

a receiver unit responsive to the communications medium, which is configured to receive the transmitted diagnostic message and process the received diagnostic, message to determine a status of said user input device;

wherein said user input device comprises:

diagnostic information determining means for determining diagnostic information;

intermittent diagnostic message transmitting means, responsive to said diagnostic information determining means, for transmitting a diagnostic message corresponding to the determined diagnostic information in said communications medium following a predetermined fixed time interval after a diagnostic message was previously transmitted from aid user input device;

wherein said receiver unit comprises:

diagnostic message receiving means, responsive to said communications medium, for receiving the transmitted diagnostic message;

diagnostic message processing means, responsive to said diagnostic message receiving means, for processing the received diagnostic message to determine a status of said user input device;

wherein said user input device further comprises:

user input accenting means for accepting a user input;

user input message transmitting means, responsive to said user input accepting means, for transmitting a corresponding user input message in said communications medium;

wherein said receiver unit further comprises:

user input message receiving means, responsive to said communications medium, for receiving the transmitted user input message; and wherein the user input message and the diagnostic message comprise respective codes selected from a common code set.

8. A system comprising:

a user input device configured to provide user inputs to a communications medium, said user input device intermittently transmitting stored diagnostic messages via the communications medium such that a diagnostic message is transmitted after a predetermined time interval following transmission of a preceding diagnostic message;

a receiver unit, responsive to the communications medium, which is configured to receive the transmitted diagnostic message and process the received diagnostic message to determine a status of said user input device;

wherein said user input device comprises:

diagnostic information determining means for determining diagnostic information;

intermittent diagnostic message transmitting means, responsive to said diagnostic information determining means, for transmitting a diagnostic message corresponding to the determined diagnostic information in said communications medium following a predetermined fixed time interval after a diagnostic message was previously transmitted from said user input device;

wherein said receiver unit comprises;

diagnostic message receiving means, responsive to said communications medium, for receiving the transmitted diagnostic message;

diagnostic message processing means, responsive to said diagnostic message receiving means, for processing the received diagnostic message to determine a status of said user input device;

wherein said user input device further comprises:

user input accepting means for accepting a user input;

user input message transmitting means, responsive to said user input accepting means, for transmitting a corresponding user input message in said communications medium;

wherein said receiver unit further comprises:

user input message receiving means, responsive to said communications medium, for receiving the transmitted user input message; and wherein said intermittent diagnostic message transmitting means comprises means for transmitting a diagnostic message immediately after transmission of a user input message.

9. A user input device for providing user inputs to a receiver unit, the user input device comprising:

diagnostic information determining means for determining diagnostic information relating to the user input device;

means for storing said diagnostic information, intermittent diagnostic message transmitting means, responsive to said means for storing, for intermittently transmitting diagnostic messages such that a diagnostic message corresponding to the determined diagnostic information is transmitted after a predetermined time interval following transmission of a preceding diagnostic message has expired;

user input accepting means for accepting a user input;

user input message transmitting means, responsive to said user input accepting means, for transmitting a corresponding user input message in said communications medium;

wherein said diagnostic information determining means comprises means, responsive to said user input accepting means, for determining the diagnostic information in response to acceptance of a user input; and wherein said user input message transmitting means and said diagnostic message transmitting means comprise a circuit, responsive to a user input, which transitions to a higher power consumption active mode from a lower power consumption standby mode in response to acceptance of a user input and which transitions to the standby mode after the user input and diagnostic messages are transmitted.

10. A user input device for providing user inputs to a receiver unit, the user input device comprising:

diagnostic information determining means for determining diagnostic information relating to the user input device;

means for storing said diagnostic information;

intermittent diagnostic message transmitting means, responsive to said means for storing, for intermittently transmitting diagnostic messages such that a diagnostic message corresponding to the determined diagnostic information is transmitted after a predetermined time interval following transmission of a preceding diagnostic message has expired;

user input accepting means for accenting a user input;

user input message transmitting means, responsive to said user input accepting means, for transmitting a corresponding user input message in said communications medium;

wherein said diagnostic information determining means comprises means, responsive to said user input accepting means, for determining the diagnostic information in response to acceptance of a user input;

wherein said user input accepting means comprises a plurality of keys; and wherein said diagnostic information determining means comprises means, responsive to said plurality of keys, for determining diagnostic information in response to a keystroke performed on a key of said plurality of keys.

11. A user input device for providing user inputs to a receiver unit, the user input device comprising:

diagnostic information determining means for determining diagnostic information relating to the user input device;

means for storing said diagnostic information;

intermittent diagnostic message transmitting means, responsive to said means for storing, for intermittently transmitting diagnostic messages such that a diagnostic message corresponding to the determined diagnostic information is transmitted after a predetermined time interval following transmission of a preceding diagnostic message has expired;

user input accepting means for accepting a user input user input message transmitting means, responsive to said user input accepting means, for transmitting a corresponding user input message in said communications medium;

wherein said diagnostic information determining means comprises means, responsive to said user input accepting means, for determining the diagnostic information in response to acceptance of a user input; and wherein the user input message and the diagnostic message comprise respective codes selected from a common code set.

12. A user input device for providing user inputs to a receiver unit, the user input device comprising:

diagnostic information determining means for determining diagnostic information relating to the user input device;

means for storing said diagnostic information;

intermittent diagnostic message transmitting means, responsive to said means for storing, for intermittently transmitting diagnostic messages such that a diagnostic message corresponding to the determined diagnostic information is transmitted after a predetermined time interval following transmission of a preceding diagnostic message has expired;

user input accepting means for accepting a user input;

user input message transmitting means, responsive to said user input accepting means, for transmitting a corresponding user input message in said communications medium;

wherein said diagnostic information determining means comprises means, responsive to said user input accepting means, for determining the diagnostic information in response to acceptance of a user input; and wherein said intermittent diagnostic message transmitting means comprises means for transmitting a diagnostic message immediately after transmission of a user input message.

13. A method of communicating diagnostic information from a user input device that is configured to communicate user inputs to a receiver unit the method comprising the steps of:

storing diagnostic information associated with the user input device; and intermittently transmitting a diagnostic message from the user input device, wherein the diagnostic message is transmitted from the user input device after a predetermined time interval following transmission of a preceding diagnostic message;

wherein said step of transmitting is preceded by the step of determining diagnostic information, and wherein said step of transmitting comprises the step of transmitting a diagnostic message corresponding to the determined diagnostic information;

the method further comprising the steps of:

accepting a user input at the user input device;

transmitting a corresponding user input message from the user input device;

wherein said step of determining comprises the step of determining the diagnostic information in response to acceptance of the user input;

wherein the user input device includes a plurality of keys, and wherein said step of determining comprises the step of determining diagnostic information in response to a keystroke performed on a key of said plurality of keys.

14. A method of communicating diagnostic information from a user input device that is configured to communicate use inputs to a receiver unit, the method comprising the steps of:

storing diagnostic information associated with the user input device; and intermittently transmitting a diagnostic message from the user input device, wherein the diagnostic message is transmitted from the user input device after a predetermined time interval following transmission of a preceding diagnostic message;

wherein said step of transmitting is preceded by the step of determining diagnostic information, and wherein said step of transmitting comprises the step of transmitting a diagnostic message corresponding to the determined diagnostic information;

further comprising the steps of:

accepting a user input at the user input device;

transmitting corresponding user input message from the user input device; and wherein the user input message and the diagnostic message comprise respective codes selected from a common code set.

15. A method of communication diagnostic information from a user input device that is configured to communicate user inputs to a receiver unit the method comprising the steps of:

storing diagnostic information associated with the user input device; and intermittently transmitting a diagnostic message from the user input device, wherein the diagnostic message is transmitted from the user input device after a predetermined time interval following transmission of a preceding diagnostic message;

wherein said step of transmitting is preceded by the step of determining diagnostic information and wherein said step of transmitting comprises the step of transmitting a diagnostic message corresponding to the determined diagnostic information;

further comprising the steps of:

accepting a user input at the user input device;

transmitting a corresponding user input message from the user input device; and wherein said step of transmitting a diagnostic message comprises the step of transmitting a diagnostic message immediately after transmission of a user input message.

16. A system a user input device configured to provide user inputs to a communications medium, said user input device intermittently transmitting stored diagnostic messages via the communications medium such that a diagnostic message is transmitted after a predetermined time interval following transmission of a preceding diagnostic message:

a receiver unit, responsive to the communications medium, which is configured to receive the transmitted diagnostic message and process the received diagnostic message to determine a status of said user input device; and wherein the stored diagnostic messages are stored in external memory.

17. A method of communicating diagnostic information from a user input device that is configured to communicate user inputs to a receiver unit, the method comprising the steps of:

storing diagnostic information associated with the user input device; and intermittently transmitting a diagnostic message from the user input device wherein the diagnostic message is transmitted from the user input device after a predetermined time interval following transmission of a preceding diagnostic message; and wherein the step of storing comprises the step of storing the diagnostic information associated with the user input device in external memory.

\* \* \* \* \*

UNITED STATES PATENT AND TRADEMARK OFFICE
CERTIFICATE OF CORRECTION

PATENT NO.       : 6,178,527 B1                                              Page 1 of 1
APPLICATION NO.  : 08/936661
DATED            : January 23, 2001
INVENTOR(S)      : Carlos E. Vidales It is certified that error appears in the above-identified patent and that said Letters Patent is hereby corrected as shown below:

Column 8, line 63, change "transmit" to --transmitting--

Column 9, line 64, change "deter" to --determining--

Column 10, line 58, change "mea" to --means--

Column 10, line 63, change "accenting" to --accepting--

Column 11, line 19, change "tat" to --that--

Column 11, line 47, change "accenting" to --accepting--

Column 15, line 4, change "communication" to --communicating--

Signed and Sealed this

Fourteenth Day of November, 2006

JON W. DUDAS
*Director of the United States Patent and Trademark Office*